3,053,859
3-UNSUBSTITUTED STEROIDS OF THE PREGNANE SERIES
Albert Bowers and James C. Orr, Mexico City, Mexico, assignors, by mesne assignments, to Syntex Corporation, a corporation of Panama
No Drawing. Filed Aug. 22, 1961, Ser. No. 133,068
25 Claims. (Cl. 260—397.3)

The present invention relates to novel cyclopentanophenanthrene compounds and to a process for the production thereof.

More particularly the present invention relates to novel 2-formyl and 2-hydroxymethyl derivatives of allopregnan-20-one, of $\Delta^2$-allopregnen-20-one and of $\Delta^{2,4}$-pregnadien-20-one and to 2-methyl-$\Delta^2$-allopregnen-20-one.

The novel compounds of the present invention are represented by the following formulas:

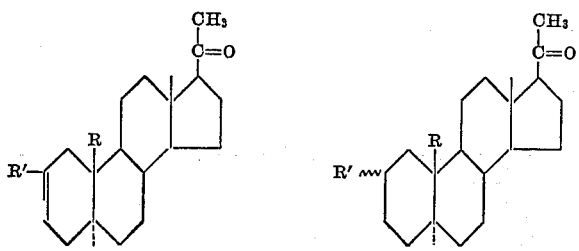

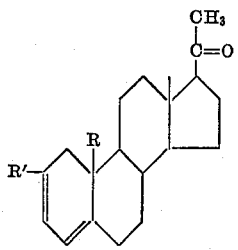 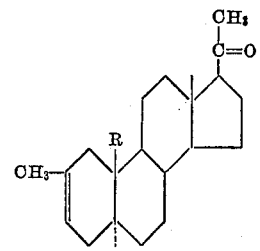

In the above formulas, R represents hydrogen or methyl; $R^1$ represents formyl (—CHO) or the group —$CH_2$—$OR^2$ wherein $R^2$ represents hydrogen or a hydrocarbon carboxylic acyl group of less than 12 carbon atoms. In the saturated compounds, $R^1$ may be in the $2\alpha$ or $2\beta$ position. The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The novel compounds represented by the above formulas are powerful progestational agents. They also exhibit anti-estrogenic, anti-gonadotrophic and anti-androgenic activities. They are useful in the treatment of premenstrual tension and lower cholesterol level in blood serum and the adrenal gland. In addition they have diuretic properties, being useful anti-aldosterone agents.

The novel compounds of the present invention which contain the formyl or hydroxymethyl group at C-2 in a steric configuration are prepared by a process illustrated by the following equation:

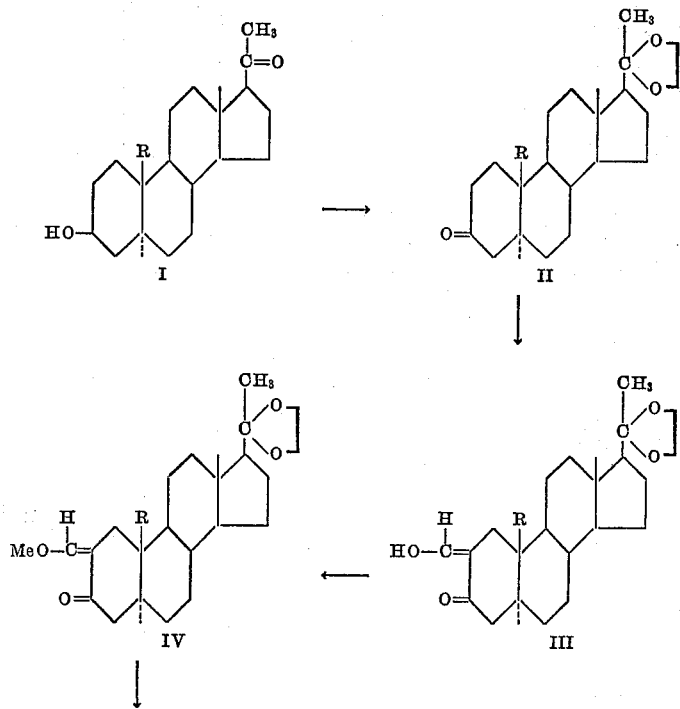

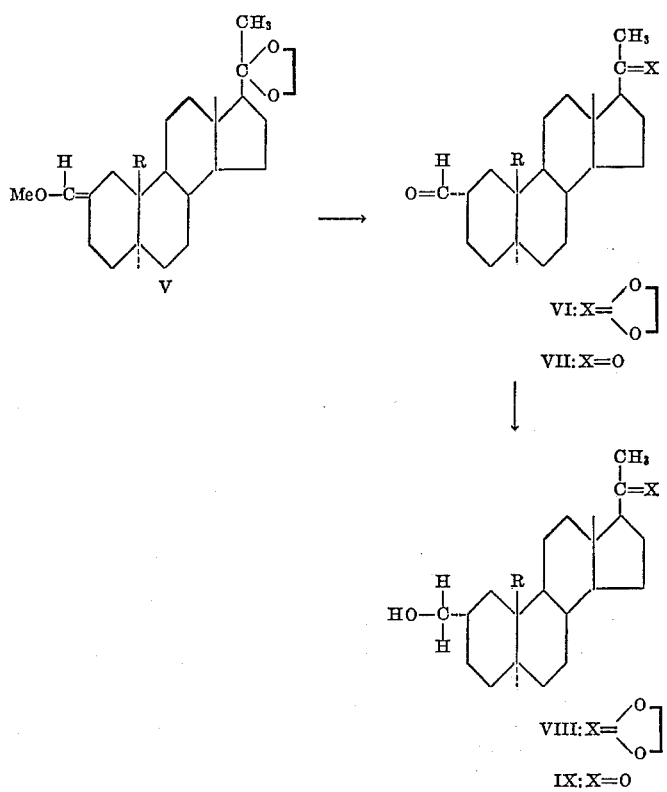

In the above formulas, R has the same meaning as previously described and Me represents the methyl group.

In practicing the process outlined above, the starting compound allopregnan-3β-ol-20-one or the 19-nor derivative thereof (I) is treated with a glycol such as ethylene glycol in the presence of p-toluenesulfonic acid to form the corresponding 20-cycloethylenedioxy derivative to thus protect the 20-keto group. Oxidation of this last formed compound, preferably under Oppenauer conditions, affords the corresponding 3-keto compound (II). Upon reaction of the thus formed 20-cycloethylenedioxy-allopregnan-3-one or the 19-nor derivative with ethyl formate, there is formed the respective 2-hydroxymethylene-20-cycloethylenedioxy-allopregnan-3-one derivative (III). This latter compound is methylated, preferably with a solution of diazomethane in a suitable organic solvent, such as methylene chloride, to afford the corresponding 2 - methoxymethylene - 20 - cycloethylenedioxy-allopregnan-3-one derivative (IV). Upon reduction of this compound with lithium aluminum hydride, there is formed the 3-desoxo compound (V) which upon treatment in a very mild acid medium affords the corresponding 2α-formyl - 20 - cycloethylenedioxy - allopregnane compound (VI). Reduction of this latter derivative, preferably with sodium borohydride, furnishes the respective 2α-hydroxymethyl-20-cycloethylenedioxy-allopregnane (VIII).

The protective cycloethylenedioxy moiety may be removed prior to the reduction with sodium borohydride by treatment with a mild acid to yield the 2α-formyl-allopregnan-20-one or 19-nor derivative thereof (VII) which in turn may be reduced to form the corresponding 2α-hydroxymethyl-allopregnan-20-one derivative (IX). The latter compound may also be prepared by removal of the cyclic ketal moiety from compound VIII in the same manner as described above.

The preparation of the novel compounds of the present invention which contain the formyl or hydroxymethyl group at C–2 and β steric configuration or with ring A unsaturation are illustrated by the following equation:

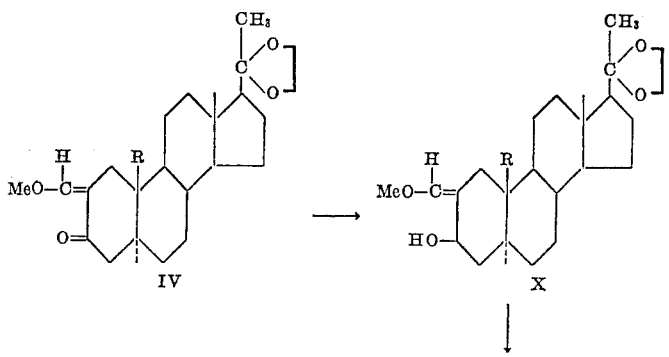

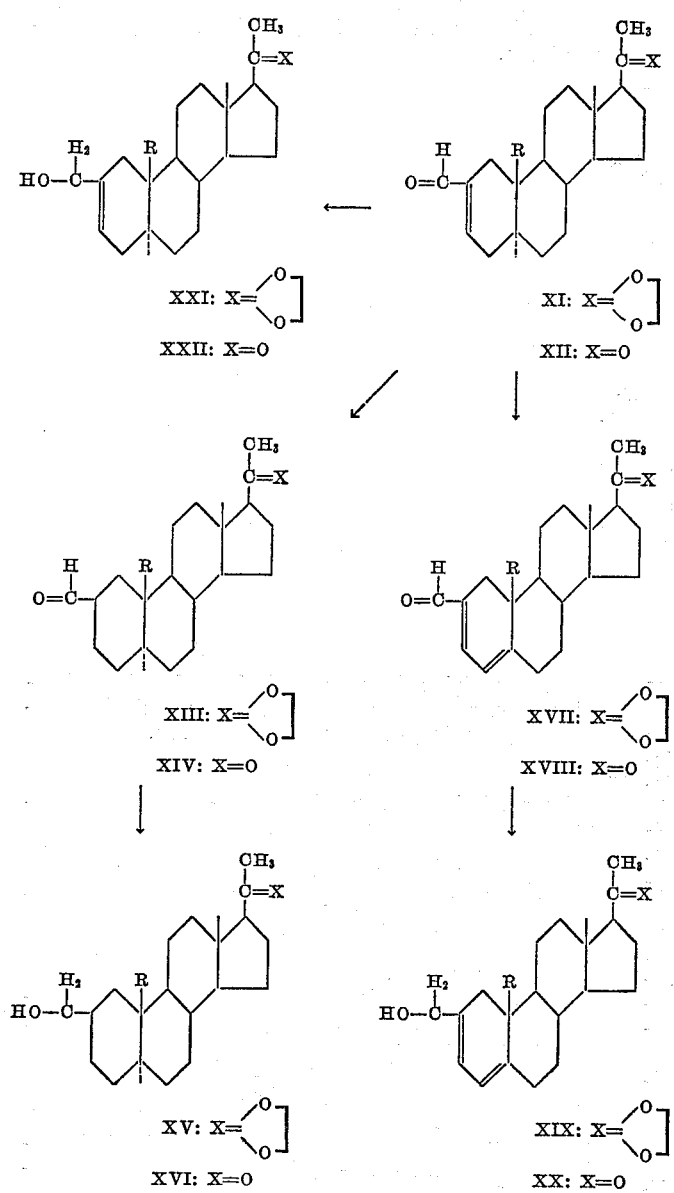

In the above equation, R and Me have the same meaning as heretofore described.

In practicing the process outlined above, the 2-methoxymethylene - 20 - cycloethylenedioxy - allopregnan - 3-one or the 19-nor derivative thereof (IV) is reduced to the corresponding 3β-ol derivative (X), which, upon treatment in a very mild acid medium readily affords the respective 2-formyl-20-cycloethylenedioxy-Δ$^2$-allopregnene derivative (XI). Hydrogenation of this latter compound in the presence of a suitable catalyst such as platinum oxide affords the 2β-formyl-cycloethylenedioxy-allopregnane derivative (XIII), which upon further reduction, preferably with sodium borohydride, affords the corresponding 2β-hydroxymethyl-20-cycloethylenedioxy-allopregnane derivative (XV).

Removal of the protective cyclic ketal moiety from the foregoing compounds as by treatment with a mild acid affords the corresponding 20-keto derivatives such as 2-formyl-Δ$^2$-allopregnan-20-one (XII), 2β-formyl-allopregnan-20-one (XIV), 2β-hydroxymethyl-allopregnan-20-one (XVI) and the corresponding 19-nor derivatives thereof.

Treatment of the 2-formyl-20-cycloethylenedioxy-Δ$^2$-allopregnene compound (XI) with N-bromosuccinimide in an inert solvent such as carbon tetrachloride, furnishes the corresponding 4β-bromo derivative which upon dehydrohalogenation with a suitable agent such as calcium carbonate in formamide yields the corresponding 2-formyl-20 - cycloethylenedioxy - Δ$^{2,4}$ - pregnadiene derivative (XVII). Reduction of this compound affords the respective 2-hydroxymethyl-20-cycloethylenedioxy-Δ$^{2,4}$-pregnadiene derivative (XIX). Similarly, hydrolysis in a mild acid medium results in removal of the 20-cycloethylenedioxy protecting group of compounds XVII and XIX to afford the corresponding 2-formyl-Δ$^{2,4}$-pregnadien-20-one (XVIII) and 2-hydroxymethyl-Δ$^{2,4}$-pregnadien-20-one (XX) derivatives.

The 2 - hydroxymethyl - 20 - cycloethylenedioxy - Δ$^2$-allopregnene derivative (XXI) is obtained by reduction of the corresponding 2-formyl-20-cycloethylenedioxy-Δ$^2$-allopregnene compound (XI), which is then converted into the 2-hydroxymethyl-Δ$^2$-allopregnen-20-one derivative (XXII) upon mild acid hydrolysis.

The hydroxymethyl derivatives described hereinabove are conventionally acylated in pyridine with an acylating agent derived from a hydrocarbon carboxylic acid of less than 12 carbon atoms of the type described previously, thus affording the corresponding 2-hydrocarbon carboxylic acyloxymethyl derivatives.

The novel 2-methyl derivatives of the present invention are prepared by the process illustrated by the following equation:

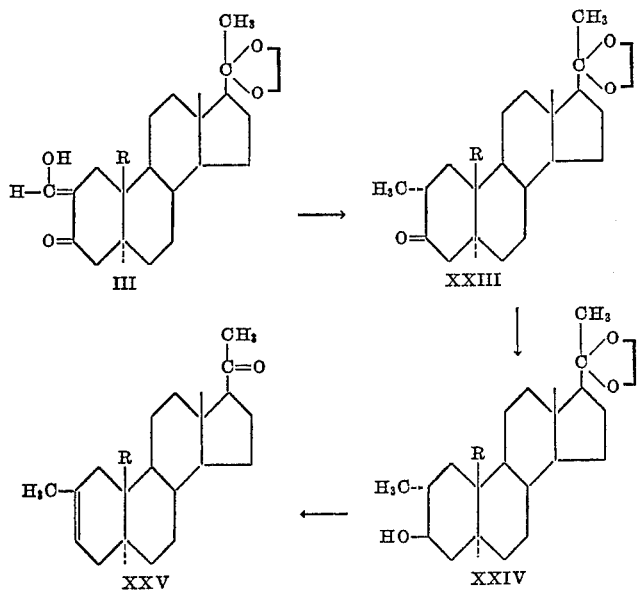

In the above formulas, R has the same meaning as previously set forth.

In practicing the process just outlined, the hereinabove obtained 2-hydroxymethylene-20-cycloethylenedioxy-allopregnan-3-one or the 19-nor derivative thereof (III) described above is hydrogenated in the presence of a suitable catalyst such as 10% palladium on charcoal, in an organic solvent, as for example, methanol, thus affording the corresponding 2α-methyl-20-cycloethylenedioxy-allopregnane-3-one compound (XXIII). Reduction of the 3-keto group to the 3β-hydroxyl and dehydration of the resulting compound (XXIV) by a suitable method, such as the reaction with tosyl chloride to form the 3β-tosylate which is then treated with collidine at reflux temperature, thus furnishing the corresponding 2-methyl-Δ²-allopregnen-20-one derivative (XXV).

The following specific examples serve to illustrate but are not intended to limit the scope of the present invention:

Example I

A mixture of 5 g. of allopregnan-3β-ol-20-one, 150 cc. of anhydrous benzene, 60 cc. of ethyleneglycol distilled sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenedioxy-allopregnan-3β-ol.

19-nor-allopregnan-3β-ol-20-one was treated by the above technique furnishing 20-cycloethylene dioxy-19-nor-allopregnan-3β-ol.

Example II

A solution of 4 g. of 20-cycloethylenedioxy-allopregnan-3β-ol in 300 cc. of toluene and 80 cc. of cyclohexanone was dried by distilling off 20 cc. of the solvent. A solution of 4 g. of aluminum isopropoxide dissolved in 28 cc. of anhydrous toluene was then added and the mixture was refluxed for 45 minutes; 16 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 20-cycloethylenedioxy-allopregnan-3-one.

When applying the same method to 20-cycloethylenedioxy-19-nor-allopregnan-3β-ol, there was obtained 20-cycloethylenedioxy-19-nor-allopregnan-3-one.

Example III

To a solution of 3 g. of 20-cycloethylene dioxy-allopregnan-3-one in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, and the solid was collected and dried under vacuum. The crude material was suspended in aqueous hydrochloric acid and was stirred at room temperature for half an hour. The precipitate was collected, washed with water and dried. Recrystallization from methylene chloride-hexane gave 2-hydroxymethylene-20-cycloethylenedioxy-allopregnan-3-one.

By the same procedure, there was treated 20-cycloethylene dioxy-19-nor-allopregnan-3-one, thus furnishing 2-hydroxymethylene - 20 - cycloethylenedioxy-19-nor-allopregnan-3-one.

Example IV

To a solution of 3 g. of 2-hydroxymethylene-20-cycloethylenedioxy-allopregnan-3-one in 50 cc. of methylene chloride were added an excess of diazomethane in ether (obtained from N-nitrosomethylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded 2-methoxymethylene-20-cycloethylenedioxy-allopregnan-3-one.

2 - hydroxymethylene - 20 - cycloethylenedioxy - 19-nor-allopregnan-3-one was treated following the above procedure, furnishing 2-methoxymethylene-20-cycloethylenedioxy-19-nor-allopregnan-3-one.

Example V

A solution of 1 g. of 2-methoxymethylene-20-cycloethylenedioxy-allopregnan-3-one in 50 cc. of tetrahydrofuran was added over a 30 minutes' period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane, thus giving 2-methoxymethylene-20-cycloethylenedioxy-allopregnane.

When applying the above technique to 2-methoxymethylene-20-cycloethylenedioxy - 19 - nor-allopregnan-3-one, there was obtained 2-methoxymethylene-20-cycloethylenedioxy-19-nor-allopregnane.

*Example VI*

A solution of 1 g. of 2-methoxymethylene-20-cycloethylenedioxy-allopregnane in 50 cc. of ether was treated with 50 cc. of ether saturated with perchloric acid for 30 minutes at 0° C. The solution was then washed with 5% aqueous sodium bicarbonate solution, and water, dried over sodium sulfate and evaporated to dryness. Recrystallization from acetone-hexane afforded 2α-formyl-20-cycloethylenedioxy-allopregnane.

By the same procedure, there was treated 2-methoxymethylene - 20 - cycloethylenedioxy-19-nor-allopregnane, thus giving 2α-formyl-20-cycloethylenedioxy-19-nor-allopregnane.

*Example VII*

A solution of 2 g. of sodium borohydride in 30 cc. of methanol was added with stirring to a solution of 2 g. of 2α-formyl-20-cycloethylenedioxy-allopregnane in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 2α-hydroxymethyl-20-cycloethylenedioxyallopregnane.

Upon treatment of 2α-formyl-20-cycloethylenedioxy-19-nor-allopregnane by the same procedure, there was obtained 2α-hydroxymethyl-20-cycloethylenedioxy 19-nor-allopregnane.

*Example VIII*

5 g. of 2-methoxymethylene-20-cycloethylenedioxy-allopregnan-3-one, obtained in accordance with Example IV, were reduced following the procedure described in Example VII, thus furnishing 2-methoxymethylene-20-cycloethylenedioxy-allopregnan-3β-ol.

By the same procedure, 2-methoxymethylene-20-cycloethylenedioxy-19-nor-allopregnan-3-one was reduced to 2-methoxymethylene-20-cycloethylenedioxy-19 - nor-allopregnan-3β-ol.

*Example IX*

4 g. of 2-methoxymethylene-20-cycloethylenedioxy-allopregnan-3β-ol in 70 cc. of warm methanol were treated with 0.25 cc. of concentrated hydrochloric acid and the resulting mixture was allowed to stand for 3 minutes. Then it was poured into a large excess of water, the formed precipitate filtered off, washed and recrystallized from acetone, thus affording 2-formyl-20-cycloethylenedioxy-Δ²-allopregnene.

Treating by the same procedure, 2-methoxymethylene-20-cycloethylenedioxy-19-nor-allopregnan-3β-ol, there was obtained 2-formyl-20-cycloethylenedioxy-19-nor-Δ²-allopregnene.

*Example X*

A solution of 2 g. of 2-formyl-20-cycloethylenedioxy-Δ²-allopregnene obtained in accordance with Example IX in 100 cc. of ethyl acetate was shaken with 100 mg. of platinum oxide catalyst in a hydrogen atmosphere until the gas uptake corresponded to one mol. The catalyst was filtered off and the filtrate evaporated to dryness. Recrystallization from acetone-hexane yielded 2β-formyl-20-cycloethylenedioxy-allopregnane.

Upon treatment of 2-formyl-20-cycloethylenedioxy-19-nor-Δ²-allopregnene by the same technique, there was formed 2β - formyl - 20 - cycloethylenedioxy-19-nor-allopregnane.

*Example XI*

2β-formyl-20-cycloethylenedioxy-allopregnane and 2β-formyl-20-cycloethylenedioxy - 19 - nor-allopregnane were reduced following the technique described in Example VII, furnishing respectively 2β-hydroxymethyl-20-cycloethylenedioxy-allopregnane and 2β-hydroxymethyl-20-cycloethylenedioxy-19-nor-allopregnane.

By the same procedure was treated 2-formyl-20-cycloethylenedioxy-Δ²-allopregnene and 2-formyl-20-cycloethylenedioxy-19-nor-Δ²-allopregnene affording 2-hydroxymethyl-20-cycloethylenedioxy-Δ²-allopregnene and 2-hydroxymethyl-20-cycloethylenedioxy - 19 - nor - Δ² - allopregnene.

*Example XII*

4.2 g. of 2-formyl-20-cycloethylenedioxy-Δ²-allopregnene obtained in accordance with Example IX in 200 cc. of carbon tetrachloride was irradiated with a GE sun lamp and refluxed with 2.7 g. of N-bromosuccinimide for 30 minutes. The mixture was filtered to eliminate the succinimide that was formed during the reaction. The filtrate was evaporated to dryness under reduced pressure. Recrystallization from methylene-chloride-hexane gave 2-formyl-4β-bromo-20-cycloethylenedioxy - Δ² - allopregnene.

1 g. of the above compound was refluxed with 1 g. of calcium carbonate and 50 cc. of dimethylformamide for 30 minutes. The mixture was filtered, the solvent evaporated under reduced pressure and the residue crystallized from acetone-hexane to afford 2-formyl-20-cycloethylenedioxy-Δ²,⁴-pregnadiene.

2-formyl-20-cycloethylenedioxy-19-nor - Δ² - allopregnene was treated by the above described technique, furnishing 2 - formyl - 20 - cycloethylenedioxy-19-nor-Δ²,⁴-pregnadiene.

*Example XIII*

2-formyl-20-cycloethylenedioxy-Δ²,⁴-pregnadiene and 2-formyl-20-cycloethylenedioxy-19-nor-Δ²,⁴ - pregnadiene were reduced following the technique described in Example VII, furnishing respectively 2-hydroxymethyl-20-cycloethylenedioxy-Δ²,⁴-pregnadiene and 2-hydroxymethyl-20-cycloethylenedioxy-19-nor-Δ²,⁴-pregnadiene.

*Example XIV*

7 g. of 2-hydroxymethylene-20-cycloethylenedioxy-allopregnan-3-one obtained in accordance with Example III were dissolved in 300 cc. of methanol and mixed with 2.5 g. of a 10% palladium on charcoal catalyst. The mixture was hydrogenated at atmospheric pressure, at approximately 25° C. until the absorption of hydrogen ceased. The catalyst was removed by filtration, 1 g. of potassium hydroxide in 5 cc. of water was added to the solution which was then kept for one hour at room temperature; 2 cc. of acetic acid were added, the solvent was completely removed under reduced pressure, water was added to the residue and the product was extracted with methylene chloride. The extract was washed with water, dried over anhydrous sodium sulfate and evaporated to dryness under vacuum. Recrystallization from acetone-hexane afforded 2α-methyl-20-cycloethylenedioxy-allopregnan-3-one.

Upon treatment by the same technique of 2-hydroxymethylene - 20 - cycloethylenedioxy-19-nor-allopregnan-3-one, there was obtained 2α-methyl-20-cycloethylenedioxy-19-nor-allopregnan-3-one.

*Example XV*

2α-methyl-20-cycloethylenedioxy-allopregnan-3-one and

2α - methyl-20-cycloethylenedioxy-19-nor-allopregnan-3-one were reduced in accordance with Example VII furnishing respectively 2α - methyl-20-cycloethylenedioxy-allopregnan-3β-ol and 2α-methyl-20-cycloethylenedioxy-19-nor-allopregnane-3β-ol.

*Example XVI*

A solution of 5 g. of 2α-methyl-20-cycloethylenedioxy-allopregnan-3β-ol in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 2α-methyl-allopregnan-3β-ol-20-one-3-tosylate.

The total crude compound was refluxed with 60 cc. of γ-collidine for 90 minutes under anhydrous conditions. The solution was cooled and filtered. The filtrate was diluted with ether, washed with dilute hydrochloric acid, sodium carbonate solution and water. The dried extract was evaporated and the residue was chromatographed on neutral alumina. Crystallization of the solid fractions from acetone-hexane afforded 2-methyl-$\Delta^2$-allopregnen-20-one.

Treatment of 2α-methyl-20-cycloethylenedioxy-19-nor-allopregnane by the same procedure yielded 2-methyl-19-nor-$\Delta^2$-allopregnen-20-one.

*Example XVII*

500 mg. of 2α-formyl-20-cycloethylenedioxy-allopregnane were dissolved in 30 cc. of acetone and treated with 50 mg. of p-toluenesulfonic acid, the reaction mixture was kept at room temperature overnight. It was then poured into ice water, extracted with ethyl acetate and the organic extract washed with water to neutral, dried and evaporated to dryness. Addition of ether gave 2α-formyl-allopregnan-20-one.

Following the above technique, there were treated the starting compounds listed below, thus furnishing the respective products hereinafter set forth:

| Starting compound | Product |
|---|---|
| 2α-formyl-20-cycloethylenedioxy-19-nor-allopregnane. | 2α-formyl-19-nor-allopregnan-20-one. |
| 2-formyl-20-cycloethylenedioxy-$\Delta^2$-allopregnene. | 2-formyl-$\Delta^2$-allopregnen-20-one. |
| 2-formyl-20-cycloethylenedioxy-19-nor-$\Delta^2$-allopregnene. | 2-formyl-19-nor-$\Delta^2$-allopregnen-20-one. |
| 2β-formyl-20-cycloethylenedioxy-allopregnane. | 2β-formyl-allopregnen-20-one. |
| 2β-formyl-20-cycloethylenedioxy-19-nor-allopregnane. | 2β-formly-19-nor-allopregnan-20-one. |
| 2-formyl-20-cycloethylenedioxy-$\Delta^{2,4}$-pregnadiene. | 2-formyl-$\Delta^{2,4}$-pregnadien-20-one. |
| 2-formyl-20-cycloethylenedioxy-19-nor-$\Delta^{2,4}$-pregnadiene. | 2-formyl-19-nor-$\Delta^{2,4}$-pregnadien-20-one. |
| 2α-hydroxymethyl-20-cycloethylenedioxy-allopregnane. | 2α-hydroxymethyl-allopregnan-20-one. |
| 2α-hydroxymethyl-20-cycloethylenedioxy-19-nor-allopregnane. | 2α-hydroxymethyl-19-nor-allopregnan-20-one. |
| 2-hydroxymethyl-20-cycloethylenedioxy-$\Delta^2$-allopregnene. | 2-hydroxymethyl-$\Delta^2$-allopregnen-20-one. |
| 2-hydroxymethyl-20-cycloethylenedioxy-19-nor-$\Delta^2$-allopregnene. | 2-hydroxymethyl-19-nor-$\Delta^2$-allopregnen-20-one. |
| 2β-hydroxymethyl-20-cycloethylenedioxy-allopregnane. | β-hydroxymethyl-allopregnan-20-one. |
| 2β-hydroxymethyl-20-cycloethylenedioxy-19-nor-allopregnane. | 2β-hydroxymethyl-19-nor-allopregnan-20-one. |
| 2-hydroxymethyl-20-cycloethylenedioxy-$\Delta^{2,4}$-pregnadiene. | 2-hydroxymethyl-$\Delta^{2,4}$-pregnadien-20-one. |
| 2-hydroxymethyl-20-cycloethylenedioxy-19-nor-$\Delta^{2,4}$-pregnadiene. | 2-hydroxymethyl-19-nor-$\Delta^{2,4}$-pregnadien-20-one. |

*Example XVIII*

A mixture of 1 g. of 2α-hydroxymethyl-allopregnan-20-one; 10 cc. of pyridine, and 2 cc. of acetic anhydride was kept overnight at room temperature. The reaction mixture was then poured into ice water, the resulting precipitate filtered off, washed with water, dried under vacuum and recrystallized from ethyl acetate-hexane, thus giving 2α-acetoxymethyl-allopregnan-20-one.

The starting compounds hereinafter listed were treated following the above technique furnishing the corresponding products set forth below:

| Starting compound | Product |
|---|---|
| 2α-hydroxymethyl-19-nor-allopregnan-20-one. | 2α-acetoxymethyl-19-nor-allopregnan-20-one. |
| 2-hydroxymethyl-$\Delta^2$-allopregnen-20-one. | 2-acetoxymethyl-$\Delta^2$-allopregnen-20-one. |
| 2-hydroxymethyl-19-nor-$\Delta^2$-allopregnen-20-one. | 2-acetoxymethyl-19-nor-$\Delta^2$-allopregnen-20-one. |
| 2-hydroxymethyl-$\Delta^{2,4}$-pregnadien-20-one. | 2-acetoxymethyl-$\Delta^{2,4}$-pregnadien-20-one. |
| 2-hydroxymethyl-19-nor-$\Delta^{2,4}$-pregnadien-20-one. | 2-acetoxymethyl-19-nor-$\Delta^{2,4}$-pregnadien-20-one. |
| 2β-hydroxymethyl-allopregnan-20-one. | 2β-acetoxymethyl-allopregnan-20-one. |
| 2β-hydroxymethyl-19-nor-allopregnan-20-one. | 2β-acetoxymethyl-19-nor-allopregnan-20-one. |

The above starting compounds were treated following the hereinabove described procedure except that acetic anhydride was substituted by propionic anhydride, caproic anhydride, cyclopentylpropionic anhydride and benzoyl chloride, thus yielding the corresponding propionoxymethyl, caproxymethyl, cyclopentylpropionoxymethyl and benzoyloxymethyl derivatives.

We claim:
1. A compound of the following formula:

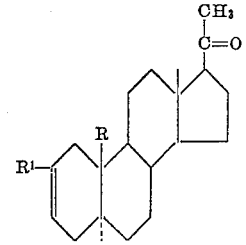

wherein R is selected from the group consisting of hydrogen and methyl; $R^1$ is selected from the group consisting of formyl (—CHO) and the group —CH$_2$—OR$^2$ wherein $R^2$ is a member of the group consisting of hydrogen and a hydrocarbon carboxylic acyl group of less than 12 carbon atoms.

2. 2-formyl-$\Delta^2$-allopregnen-20-one.
3. 2-formyl-19-nor-$\Delta^2$-allopregnen-20-one.
4. 2-hydroxymethyl-$\Delta^2$-allopregnen-20-one.
5. 2-hydroxymethyl-19-nor-$\Delta^2$-allopregnen-20-one.
6. 2-acetoxymethyl-$\Delta^2$-allopregnen-20-one.
7. A compound of the following formula:

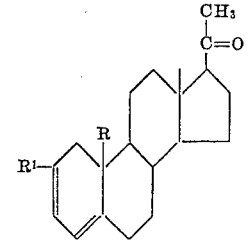

wherein R is selected from the group consisting of hydrogen and methyl; $R^1$ is selected from the group consisting of formyl (—CHO) and the group —CH$_2$—OR$^2$ wherein $R^2$ is a member of the group consisting of hydrogen and a hydrocarbon carboxylic acyl group of less than 12 carbon atoms.

8. 2-formyl-$\Delta^{2,4}$-pregnadien-20-one.
9. 2-formyl-19-nor-$\Delta^{2,4}$-pregnadien-20-one.
10. 2-hydroxymethyl-$\Delta^{2,4}$-pregnadien-20-one.
11. 2-hydroxymethyl-19-nor-$\Delta^{2,4}$-pregnadien-20-one.
12. 2-acetoxymethyl-$\Delta^{2,4}$-pregnadien-20-one.

13. A compound of the following formula:

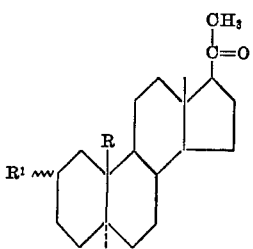

wherein R is selected from the group consisting of hydrogen and methyl; $R^1$ is selected from the group consisting of formyl (—CHO) and the group —$CH_2$—$OR^2$ wherein $R^2$ is a member of the group consisting of hydrogen and a hydrocarbon carboxylic acyl group of less than 12 carbon atoms.

14. 2α-formyl-allopregnan-20-one.
15. 2β-formyl-allopregnan-20-one.
16. 2α-formyl-19-nor-allopregnan-20-one.
17. 2β-formyl-19-nor-allopregnan-20-one.
18. 2α-hydroxymethyl-allopregnan-20-one.
19. 2β-hydroxymethyl-allopregnan-20-one.
20. 2α-hydroxymethyl-19-nor-allopregnan-20-one.
21. 2β-hydroxymethyl-19-nor-allopregnan-20-one.
22. 2α-acetoxymethyl-allopregnan-20-one.
23. 2β-acetoxymethyl-allopregnan-20-one.
24. 2-methyl-$\Delta^2$-allopregnen-20-one.
25. 2-methyl-19-nor-$\Delta^2$-allopregnen-20-one.

No references cited.